(12) United States Patent
Wilde et al.

(10) Patent No.: US 12,443,255 B2
(45) Date of Patent: Oct. 14, 2025

(54) SCHEDULING JOBS FOR PROCESSOR-BASED NODES TO REGULATE COOLANT FLOW TEMPERATURES

(71) Applicant: HEWLETT PACKARD ENTERPRISE DEVELOPMENT LP, Spring, TX (US)

(72) Inventors: Torsten Wilde, Berlin (DE); Rob J. Rongstad, Chippewa Falls, WI (US); Peter A. Hansen, Spring, TX (US); Robert E. Mascia, Chippewa Falls, WI (US); Steven J. Martin, Plano, TX (US); Steven J. Dean, Chippewa Falls, WI (US); Harvey E. White, Jr., Spring, TX (US); Brian T. Purcell, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 373 days.

(21) Appl. No.: 18/180,390

(22) Filed: Mar. 8, 2023

(65) Prior Publication Data
US 2024/0306352 A1    Sep. 12, 2024

(51) Int. Cl.
G06F 1/20    (2006.01)
H05K 7/20    (2006.01)

(52) U.S. Cl.
CPC ......... *G06F 1/206* (2013.01); *H05K 7/20281* (2013.01)

(58) Field of Classification Search
CPC ....... G06F 1/206; G06F 1/20; H05K 7/20945; H05K 7/20772; H05K 7/20836

USPC .......................................... 700/300; 718/100
See application file for complete search history.

(56) References Cited

U.S. PATENT DOCUMENTS

| | | | |
|---|---|---|---|
| 8,245,059 B2 | 8/2012 | Jackson | |
| 8,539,059 B2 | 9/2013 | Parolini et al. | |
| 9,164,566 B2 | 10/2015 | Ghose | |
| 9,405,348 B2 | 8/2016 | Jackson | |
| 9,696,235 B2 | 7/2017 | Alshinnawi et al. | |
| 9,715,264 B2 * | 7/2017 | Ghose .............. | G06K 19/07722 |
| 9,939,834 B2 | 4/2018 | Bodas et al. | |
| 10,606,642 B1 | 3/2020 | Franklin et al. | |
| 2013/0264046 A1 * | 10/2013 | Chainer ............. | G05D 23/1932 |
| | | | 165/287 |
| 2014/0298349 A1 | 10/2014 | Jackson | |
| 2016/0188365 A1 | 6/2016 | Bodas et al. | |
| 2017/0261380 A1 * | 9/2017 | Cher ...................... | G06F 1/206 |
| 2018/0317347 A1 * | 11/2018 | Cader ................ | H05K 7/20836 |
| 2020/0163257 A1 | 5/2020 | Franz et al. | |

(Continued)

*Primary Examiner* — Chun Cao
(74) *Attorney, Agent, or Firm* — Trop, Pruner & Hu, P.C.

(57) ABSTRACT

A process includes communicating a coolant flow between an inlet and an outlet of a coolant subsystem that is associated with a cooling domain to remove thermal energy from a plurality of processor-based nodes of the cooling domain. The communication of the coolant flow has associated predefined parameters. The process includes regulating a temperature of the coolant flow at the outlet. In accordance with example implementations, the regulation includes determining, based on the predefined parameters, a minimum collective power consumption by the processor-based nodes to maintain a temperature of the coolant flow at the outlet at or above a minimum threshold temperature, and based on the minimum power consumption, scheduling jobs to be executed by the nodes.

20 Claims, 7 Drawing Sheets

(56) References Cited

U.S. PATENT DOCUMENTS

| | | |
|---|---|---|
| 2021/0084797 A1 | 3/2021 | Shao et al. |
| 2022/0174847 A1* | 6/2022 | Heydari .................. G06F 1/206 |
| 2023/0056610 A1* | 2/2023 | Heydari ............... H05K 7/2079 |
| 2023/0380102 A1* | 11/2023 | Ahuja ................ H05K 7/20272 |

* cited by examiner

SCHEDULING JOBS FOR PROCESSOR-BASED NODES TO REGULATE COOLANT FLOW TEMPERATURES

BACKGROUND

The operation of a processor-based platform (e.g., a blade server) may produce a considerable amount of thermal energy, or waste heat, which if not adequately removed, may cause heat-dissipating components of the platform to exceed their thermal specifications. One way to remove waste heat from a computer platform is to circulate a liquid coolant flow through coolant flow plates (or "cold plates") that are located near heat-dissipating components of the platform.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The ever-increasing processing powers of computer systems corresponds to ever-increasing power consumption footprints. Due to such factors as rising energy prices and legislative frameworks to promote energy sustainability, it may be beneficial to increase the power efficiencies of computer systems.

One approach to increase the power efficiency of a computer system is to capture waste heat from the computer system and use the captured waste heat to drive another energy consuming process. One way to capture waste heat from a computer system is to circulate a liquid coolant flow so that the circulating coolant flow absorbs, or captures, the waste heat that is produced by the system's heat-dissipating components. The captured waste heat may be transferred from the computer system to another system (called a "captured waste heat consumer system" herein) that provides the energy consuming process that is driven by the captured waste heat.

The energy consuming process may take on one of many different forms. As an example, a captured waste heat consumer system may be a heating, ventilation, and air conditioning (HVAC) system, such as an HVAC system of a building or a nearby building that houses a computer system. For example, the HVAC system may include a heat exchanger that transfers captured waste heat from the computer system's outgoing coolant flow to an air flow to heat a building. As another example, an HVAC system may include an adsorption chiller or an absorption chiller, which uses captured waste heat to drive a thermodynamic process to chill water (e.g., chill water for air conditioning).

As another example, a captured waste heat consumer system may be an electricity generation system. For example, an electricity generation system may include an electrical generator that is actuated by a turbine, and captured waste heat may be used to generate steam to drive the turbine. As another example, an electricity generation system may use the captured waste in a thermoelectric process (e.g., a Seebeck process or a Peltier process) to generate electricity.

Regardless of the particular application or use of the captured waste heat, the waste heat consumer system may have an associated, specified minimum temperature for the coolant flow that is received by the system. Accordingly, the coolant flow (called the "outgoing coolant flow" or "outgoing primary coolant flow" herein) that is provided by the computer system may be constrained by the minimum temperature specification, and the computer system may regulate the temperature of the outgoing coolant flow to meet this specification.

One way for a computer system to regulate the temperature of an outgoing coolant flow is by regulating the volume flow of the coolant via one or multiple flow control devices (e.g., pumps and/or flow control valves). Volume flow-based regulation of the outgoing coolant flow temperature alone, however, may be relatively energy inefficient.

In accordance with example implementations that are described herein, a computer system uses job scheduling to regulate the temperature of an outgoing coolant flow. In accordance with some implementations, the job scheduling-based temperature regulation may be used in combination with other mechanisms to regulate coolant temperature. For example, in accordance with some implementations, the computer system may enhance (e.g., maximize) the power that is consumed by nodes processing jobs for purposes of enhancing (e.g., maximizing) the corresponding produced waste heat. As another example, in accordance with some implementations, the computer system may use volume flow-based temperature regulation. In accordance with further implementations, the computer system may solely use job-scheduling-based regulation of the coolant temperature.

More specifically, in accordance with example implementations, a computer system includes processor-based nodes (called "nodes" herein), and for thermal management purposes, the nodes are partitioned, or grouped, into cooling domains. As an example, the computer system may include one or multiple rack-based computer subsystems, or "racks," and the nodes may be hosted by blade servers that are installed in the rack(s). In an example, a particular blade server may host multiple nodes, and a cooling domain may correspond to the blade server and include the nodes hosted by the blade server. In another example, the nodes of a single blade server may be partitioned into multiple cooling domains. In other examples, a cooling domain may include nodes that are hosted by multiple blade servers.

Regardless of how the nodes are partitioned among cooling domains, a liquid coolant flow, which is referred to as a "coolant flow" herein, may be circulated through coolant flow plates, or cold plates, of a cooling domain for purposes of capturing, or absorbing, waste heat that is produced by heat-dissipating components of the cooling domain. In an example, a cooling domain includes a blade server, and a coolant flow may be circulated through cold plates of the blade server to absorb waste heat that is produced due to the operations of heat-dissipating components (e.g., central processing units (CPUs) and/or graphics processing units (GPUs)) of the blade server.

A cooling domain receives an incoming coolant flow, circulates the incoming coolant flow through multiple flow paths and provides an outgoing coolant flow. In accordance with example implementations, the coolant flow paths of the cooling domains may be part of a secondary coolant subsystem of the computer system. In accordance with example implementations, the secondary coolant subsystem merges, or combines, the individual cooling domain outgoing coolant flows together to form a coolant outlet flow that circulates through a secondary loop of a heat exchanger, for purposes of transferring waste heat to a primary coolant subsystem of the computer system. The reduced temperature coolant flow exits the secondary loop of the heat exchanger to provide the incoming coolant flows to the cooling domains.

The coolant flow of the primary coolant subsystem, in accordance with example implementations, is received from a captured waste heat consumer system, circulates through a primary loop of the heat exchanger to absorb waste heat, and is provided as an outgoing coolant flow (the "primary outgoing coolant flow") to the captured waste heat consumer system.

In accordance with example implementations, the computer system regulates the temperature of the primary outgoing coolant flow to maintain the temperature at or above a minimum threshold temperature (e.g., a minimum coolant temperature specified for the captured waste heat consumer system) by regulating the scheduling of jobs for nodes of the computer system's cooling domains. In this context, a "job" refers to a unit of work that may be assigned to a particular node. In an example, a set of jobs may be associated with a particular application and may be assigned to a group of nodes. A message passing interface (MPI) job is an example of a "job." In an example, a given job may be divided into a set of ranks (e.g., MPI ranks), or processes, and each rank of a given job may be processed in parallel with the other ranks of the job. A job scheduler of the computer system may, in an example, schedule the ranks of each job to a particular set of nodes.

The computer system may, in accordance with example implementations, set target outgoing coolant flow temperatures (or "target temperatures") for respective cooling domains. The computer system may then schedule jobs for the nodes of each cooling domain in a way that maintains the temperature of the cooling domain's outgoing coolant flow at or above the cooling domain's target temperature. Maintaining the outgoing coolant flows from the cooling domain at or above their respective target temperatures, in turn, results in the temperature of the composite primary outgoing coolant flow being at or above the minimum threshold temperature that is specified for the captured waste heat consumer system. The use of job scheduling to regulate a coolant flow temperature may be beneficial for a number of reasons, such as a decreased power consumption footprint, a faster transient response time and the accommodation of a wider range of processing loads.

Figure 1:
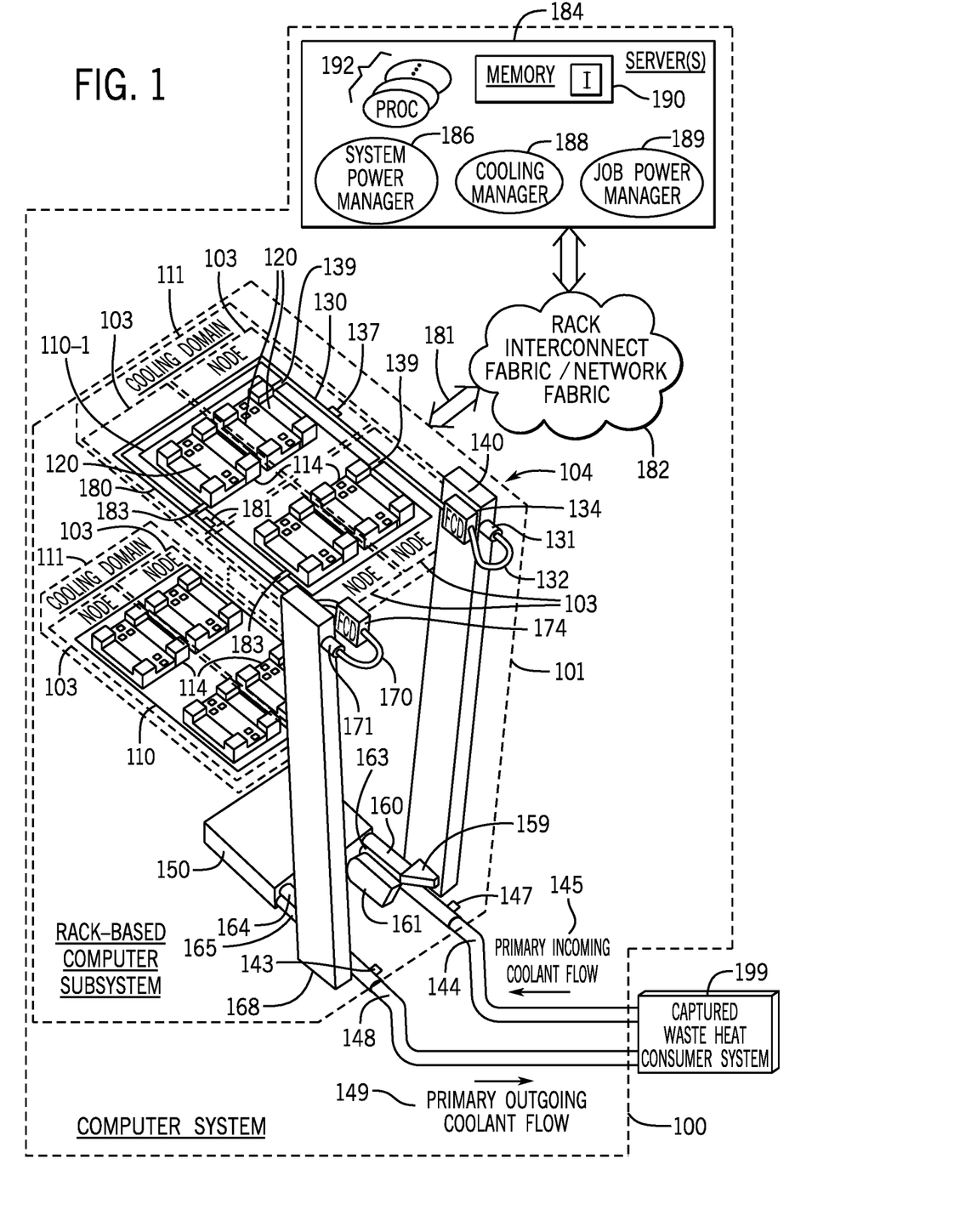
FIG. 1 is a schematic diagram of a computer system that provides a coolant flow to a captured waste heat consumer system and schedules jobs to regulate a temperature of the coolant flow according to an example implementation.

As a more specific example, FIG. 1 depicts a computer system 100, in accordance with some implementations. As described herein, the computer system 100 circulates a liquid coolant flow through various coolant flow paths to capture waste heat that is produced due to processor-based nodes 103 (called "nodes 103" herein) of the computer system 100 executing jobs. The captured waste heat is transferred to an outgoing coolant flow (called a "primary outgoing coolant flow 149" herein) that is routed to a captured waste heat consumer system 199. The captured waste heat consumer system 199 has an associated, specified minimum threshold temperature for the primary outgoing coolant outlet flow 149. As described herein, the computer system 100 schedules jobs for the nodes 103 in a way that maintains the temperature of the primary outgoing coolant outlet flow 149 at or above the specified minimum threshold temperature.

The computer system 100, in general, may include various heat-dissipating components, such as central processing units (CPUs), graphics processing units (GPUs), network interface controllers (NICs), power transistors, voltage regulators, as well as other heat-dissipating components. The waste heat that is produced by at least some of these components (e.g., CPUs and GPUs) is correlated to the job execution activity of the nodes 103 that are associated with the components.

In accordance with example implementations, the computer system 100 includes a primary coolant subsystem (or a "facility side coolant subsystem") that receives a primary incoming coolant flow 145 from the captured waste heat consumer system 199. The primary coolant subsystem absorbs captured waste heat from a secondary coolant subsystem of the computer system 100 and provides the primary outgoing coolant flow 149 to the captured waste heat consumer system 199. In accordance with example implementations, the secondary coolant subsystem circulates a coolant flow to absorb, or capture, waste heat from heat-dissipating components of the computer system 100 so that the captured waste heat may be transferred to the primary coolant subsystem. The coolant flows in the respective primary and secondary coolant subsystems are isolated from each other, and in accordance with example implementations, a heat exchanger 150 transfers thermal energy between the coolant subsystems.

The coolant may have any of a number of compositions, depending on the particular implementation, such as deionized water, distilled water, glycol, an oil, a mixture of the foregoing liquids or another liquid or liquid mixture. Moreover, depending on the particular implementation, the coolants of the first and second coolant subsystems may have the same composition or may have different compositions.

The primary coolant subsystem includes an inlet 144 that receives the primary incoming coolant flow 145 from the captured waste heat consumer system 199. The primary coolant subsystem further includes an outlet 148 that provides the primary outgoing coolant flow 149 to the captured waste heat consumer system 199. The captured waste heat consumer system 199 transfers thermal energy from the received primary outgoing coolant flow 149 to drive any of a number of different energy consuming processes (e.g., a thermodynamic process to chill water, a process to heat air, a process to generate electricity or another process). Accordingly, the temperature of the resulting primary incoming coolant flow 145 has a lower temperature than the temperature of the primary outgoing coolant flow 149.

In accordance with example implementations, the coolant circulates in the primary coolant subsystem in a direction from the inlet 144, to a primary loop inlet 163 of the heat exchanger 150 and through a primary loop of the heat exchanger 150 to absorb captured waste heat from the secondary coolant subsystem. The coolant exits the primary loop of the heat exchanger 150 at a primary loop outlet 165, which is connected to the outlet 148. In accordance with some implementations, the primary coolant subsystem may include a controllable valve 161 (e.g., a modulating valve) that is inline with the inlet 144 and may be used for purposes of regulating the flow volume of the primary coolant flow. In accordance with example implementations, in addition to or in substitution thereof, the primary coolant subsystem may include one or multiple other components to regulate the flow volume, such as one or multiple pumps (not shown), a controllable valve coupled to the primary loop outlet 165, as well as other possible volume control components.

The secondary coolant subsystem, in accordance with example implementations, includes a rack-based coolant supply manifold 140 that is connected to an outlet 160 of the secondary cooling loop of the heat exchanger 150. The secondary coolant subsystem further includes a coolant return manifold 168 that is connected to an inlet 164 of the secondary cooling loop of the heat exchanger 150. Coolant circulates in the secondary coolant subsystem in a direction from the outlet 160 and through ports of the coolant supply manifold 140 to supply coolant flow paths that circulate among the heat-dissipating components of the nodes 103 for purposes of absorbing waste heat from the components. The coolant flows from the coolant flow paths return to respective ports of the coolant return manifold 168 to form a composite coolant flow that is received by the inlet 164 of the secondary cooling loop of the heat exchanger 150. The coolant flow received at the inlet 164 circulates through the secondary cooling loop of the heat exchanger 150 to transfer waste heat to the coolant flow that circulates in the primary coolant subsystem.

For the specific example implementation that is depicted in FIG. 1, the computer system 100 includes a rack-based computer subsystem 101 in which server trays 110 are mounted to a frame called a "rack." The rack-based computer subsystem 101 may be alternatively referred to as a "rack-based computer system" or a "rack." For the particular example that is depicted in FIG. 1, the server trays 110 are vertically-arranged in the rack. As another example, in accordance with another implementation, the server trays 110 may be organized in horizontally-arranged groups, with the groups being vertically-arranged in the rack.

In accordance with example implementations, a server tray 110 may include one or multiple blade servers 114. Although FIG. 1 depicts two blade servers 114 per server tray, in accordance with further implementations, a server tray 110 may have a single blade server 114 or may have more than two blade servers 114.

The blade server 114 is an example of a computer platform. In accordance with further implementations, a computer system may have one or multiple computer platforms other than blade servers. As examples, a computer platform may be a rack-based server, a network switch, a gateway, a tablet computer, an edge processing subsystem, a desktop computer or any other electronic device that includes one or multiple processors (e.g., one or multiple CPU and/or GPU cores).

FIG. 1 specifically depicts the routing of coolant flow paths through a particular server tray 110-1. Other server trays 110 of the rack-based computer subsystem 101 may have similar coolant flow paths and features, in accordance with example implementations. Turning now to the specific coolant flow path details for the server tray 110-1, the coolant supply manifold 140 has an outlet port that is connected via a disconnect 131 to a coolant supply tubing 132. In accordance with some implementations, a flow control device 134 (e.g., a pump or a controllable valve) may be connected between the coolant supply tubing 132 and a coolant supply feeder tubing 130. The coolant supply feeder tubing 130 has outlet ports that are connected to respective coolant feeder lines 139 that provide coolant flows to coolant flow paths of the blade servers 114.

In accordance with example implementations, the coolant return manifold 168 has an inlet port that is connected via a disconnect 171 to a coolant return tubing 170. In accordance some implementations, a flow control device 174 (e.g., a pump or a controllable valve) may be connected between the coolant return tubing 170 and a coolant return tubing 180. The coolant return line tubing 170 has inlet ports that are connected to receive coolant flows from respective coolant return lines 183 from the blade servers 114 of the server tray 110-1.

The flow control devices 134 and 174 and similar flow control devices for the other server trays 110 may be controlled to independently regulate the volume of the coolant flows through the server trays 110. In this manner, in accordance with some implementations, for the server tray 110-1, one or both flow control devices 134 and 174 may be controlled for purposes of regulating the volume of coolant flow through the server tray 110-1. In accordance with further implementations, the secondary coolant subsystem may include a single flow control device (e.g., either the flow control device 134 or the flow control device 174 for the server tray 110-1) per server tray 110 to regulate the volume of coolant flow through the server tray 110. As described further herein, the computer system 100 may use flow control device(s) per server tray 110 to regulate the volume of the coolant flow through the blade servers 114 of a given server tray 110 for purposes of regulating the temperature of the outgoing coolant flow from the server tray 110. In accordance with yet further implementations, the secondary coolant subsystem may not include any flow control devices per server tray 110. For example, for these implementations, the computer system 100 may use one or multiple flow control devices (e.g., pump(s) and/or controllable valve(s)) to regulate the volume of coolant flow through the manifolds 140 and 168 and not have flow control devices for the different server trays 110.

In accordance with example implementations, the blade server 114 may include one or multiple coolant flow plates, called "cold plates 120" herein. In general, the cold plates 120 may be physically located at or near heat-dissipating components of the blade server 114 for purposes of absorbing waste heat from the heat-dissipating components and transferring the absorbed waste heat to the circulating coolant flow.

The cold plate 120, in accordance with example implementations, is connected to a coolant flow path between the coolant supply feeder tubing 130 and the coolant return tubing 180. As an example, in accordance with some implementations, a cold plate 120 may include one or multiple flow plates that have serpentine flow channels to communicate a coolant flow. In accordance with example implementations, the cold plates 120 of a particular blade server 114 may form a serial chain coolant flow path. As an example, as depicted in FIG. 1, a particular coolant flow path for a blade server 114 may include four cold plates 120 that are arranged a serial chain. As an example, the first cold plate 120 of the serial chain may include an inlet that receives an inlet coolant flow from an inlet coolant line 139. An outlet of the first cold plate 120 is connected to the inlet of the second cold plate 120 of the serial chain coolant flow path. The outlet of the second cold plate 120 is connected to the inlet of the third cold plate 120 of the serial chain coolant flow path. The outlet of the third cold plate 120 is connected to the inlet of the fourth cold plate 120 of the serial chain coolant. The outlet of the fourth cold plate 120 is connected to a coolant outlet line 183.

In accordance with some implementations, one or multiple sensors 137 may be coupled inline with and/or to the coolant supply feeder tubing 130. As an example the sensor(s) 137 may include a temperature sensor that provides an indication (e.g., an analog signal or digital bits) that represents a sensed temperature of the coolant flow in the tubing 130. In accordance with some implementations, one or multiple sensors 181 may be coupled inline with and/or to the coolant return tubing 180. As an example, the sensor(s) 181 may include a temperature sensor that provides an indication (e.g., an analog signal or digital bits) that represents a sensed temperature of the coolant flow in the tubing 180.

The blade servers 114, in accordance with example implementations, host, or provide, the nodes 103. In this context used herein, a "node" refers to a logical or physical entity that is constructed to execute machine-readable instructions to process jobs that are scheduled for the node. As an example of a "node," in accordance with some implementations, a node may correspond to hardware components that execute an instance of an operating system. For example, a blade server 114 may have multiple, multi-core CPUs, and a group of processing cores of a particular CPU may execute a particular operating system instance and be considered to be part of the same node. As a more specific example, in accordance with some implementations, a particular blade server 114 may have two, multi-core CPUs, with each CPU providing cores for two operating system instances and two corresponding nodes 104. As another example of a "node," in accordance with some implementations, a node may be a single blade server 114 in its entirety. As another example, a "node" may be multiple blade servers 114. As another example, a node may be a physical partition (e.g., a particular CPU or set of CPU cores) of a blade server 114, independent of operating system instance affiliation.

For the following discussion, it is assumed that a node 103 refers to hardware components that correspond to a particular operating system instance and may correspond to, for example, one or multiple processing cores of a particular blade server 114. As such, for the following discussion, a particular blade server 114 may have multiple nodes 103 (e.g., two nodes 103 per blade server 114).

In accordance with example implementations, the rack-based computing subsystem 101 is partitioned into cooling zones, or cooling domains 111. Here, a "cooling domain" refers to a part of the rack-based computing system 101 whose outgoing coolant flow temperature is regulated, or controlled, independently from other parts of the rack-based computer subsystem 101. As an example, a cooling domain 111 may include one or multiple server trays 110. As depicted in FIG. 1, in accordance with some implementations, a cooling domain 111 may include a single server tray 110. A cooling domain 111 therefore may include multiple nodes 103, in accordance with example implementations.

As described further herein, for purposes of regulating the temperature of the coolant outlet flow from a cooling domain 111, the computer system 100 may control the volume of the coolant flow and control how jobs are scheduled for the cooling domain's nodes 103. For example, for the example server tray 110-1, in accordance with example implementations, the computer system 100 may regulate the flow control devices 134 and 174 and may control the scheduling of jobs for the nodes 103 of the server tray 110-1 for purposes of regulating the temperature of the coolant flow in the coolant return tubing 180.

Cooling domains 111 may correspond to node 103 groupings that differ from the groupings that are depicted in FIG. 1, in accordance with further implementations. As an example, in accordance with further implementations, a cooling domain 111 may include multiple server trays 110. As another example, in accordance with further implementations, a given server tray 110 may be partitioned among multiple cooling domains 111.

The computer system 100 may have cooling domains other than server blade-based cooling domains, in accordance with some implementations. For example, in accordance with some implementations, the computer system 100 may include a cooling domain that includes one or multiple power supplies for the rack-based computer subsystem 101. As another example, in accordance with some implementations, the computer system 100 may include a cooling domain for a power distribution unit (PDU) of the rack-based computer subsystem 101. As another example, in accordance with some implementations, the computer system 100 may include cooling domains for different parts of a PDU. The computer system 100 may, through coolant volume regulation and/or other ways (e.g., power regulation) regulate the outlet coolant flow temperatures of these cooling domains.

In accordance with some implementations, the computer system 100 includes a system power manager 186 that is construct to schedule jobs in a way that regulates the temperature of the primary outgoing coolant flow 149 such that the temperature remains at or above a specified minimum threshold temperature. In accordance with some implementations, the system power manager 186 may take into account various control parameters to determine target outgoing coolant flow temperatures for respective cooling domains 111. These control parameters may include, as examples, a temperature of the primary incoming coolant flow 145 (e.g., a temperature provided by a temperature sensor 147) and/or a temperature of the primary outgoing coolant flow 149 (e.g., a temperature provided by a temperature sensor 143). As another example, the control parameters may include a CPU utilization per node 103 for each cooling domain 111. As another example, the control parameters may include the current, sensed outgoing coolant flow temperature for each cooling domain 111. As another example, the control parameters may include the sensed or calculated current coolant flow volume for each cooling domain 111. As another example, the control parameters may include the temperature of the incoming coolant flow to each cooling domain 111.

As an example, in accordance with some implementations, the system power manager 186 may set the same target outgoing coolant flow temperature for each cooling domain 111. As another example, in accordance with further implementations, the system power manager 186 may independently determine target temperatures for the cooling domains 111, which may result in varying target temperatures. Regardless of the methodology used, the system power manager 186, in accordance with example implementations, sets target temperatures for the cooling domains 111 and uses job scheduling to regulate the corresponding actual temperatures at or above their respective target temperatures so that the temperature of the primary outgoing coolant flow 149 remains at or above the minimum threshold temperature that is specified for the captured waste heat consumer system 199.

The following is an example of how the system power manager 186 may schedule jobs for the nodes 103 of a particular cooling domain 111 for purposes of maintaining the temperature of the cooling domain's outgoing coolant flow at or above a target temperature (called a "$T_{EXIT}$ temperature" herein). In accordance with example implementations, the system power manager 186 determines a minimum collective power level consumption (called a "$P_{NODE\_MIN}$ power consumption" herein) by the nodes 103 of the cooling domain 111 to maintain the temperature of the outgoing coolant flow from the cooling domain 111 at or above the $T_{EXIT}$ temperature. The system power manager 186 may then, in accordance with example implementations, schedule a batch of jobs for the nodes 103 to maintain the collective power consumption of the nodes 103 at or above the $P_{NODE\_MIN}$ power consumption based on power profiles of the jobs. Here, a "power profile" for a job refers to an indication or representation of the power that is expected to be consumed in the processing of the job by a node 103.

After scheduling the batch of jobs, the system manager 186 may then communicate the corresponding job schedule to a job power manager 189, which, in accordance with example implementations, optimizes the execution of each scheduled job for an enhanced power consumption. For example, in accordance with some implementations, for purposes of pushing an application from which jobs originate into more energy efficient (instructions per Watt) operating points, there may be job power limits, or power caps. The job power manager 189 may remove any such power cap for a job for purposes enhancing (e.g., maximizing) the power consumption (and therefore, enhancing the corresponding waste heat) that is produced due to the node's execution of the job. As a specific example, in accordance with some implementations, the job power manager 189 may disable dynamic power management features of a node 103 executing the job for purposes of enhancing the corresponding power consumption.

As another example of enhancing the power consumed for the processing of a job, the job power manager 189 may enable a turbo mode for a node 103, which allows the node 103 to exceed a rating specification, if the node 103 has the power and thermal headroom to do so. For example, a given node 103 may be rated to operate at a maximum frequency of 3 GigaHertz (GHz), and in a turbo node, the node 103 may operate at a frequency (e.g., 3.2, 3.4, or 3.6 GHZ) that exceeds the specified maximum frequency for a short time period.

In addition to scheduling jobs and enhancing job power consumption to regulate the temperature of the outgoing coolant flow of a cooling domain 111, in accordance with example implementations, the computer system 100 may regulate the volume of the coolant flow. More specifically, in accordance with some implementations, the system power manager 186 may send the target temperature for a cooling domain 111 to a cooling manager 188 of the computer system 100. The cooling manager 188 may perform such actions as regulating the flow control devices 134 and 174 to maintain the temperature of the outgoing coolant flow of a cooling domain 111 at or above a target temperature. In another example, the cooling manager 188 may regulate the opening of the valve 161 to maintain the temperature of the primary outgoing coolant flow 149 at or above a minimum threshold temperature. As another example, the cooling manager 188 may regulate a pump (not shown) of the primary coolant flow subsystem to maintain the temperature of the primary outgoing coolant flow 149 at or above a minimum threshold temperature. As another example, the cooling manager 188 may regulate operation of a controllable valve of a cooling domain 111 or regulate operation of a controllable valve of the secondary coolant subsystem.

In accordance with some implementations, the system power manager 186, the cooling manager 188 and/or the job power manager 189 may be entities that are formed by one or multiple processors 192 executing machine-executable instructions 191 (or "software"). As an example, the processor 192 may be one or multiple CPU processing cores that located on one or multiple servers 184. The server(s) 184 may include one or multiple servers that are part of the rack-based computer subsystem 101 and/or may include one or multiple servers that are remotely disposed with respect to the rack-based computer subsystem 101 (e.g., disposed at a geographical location other than a data center at which the rack-based subsystem 101 is disposed).

As an example, in accordance with example implementations, a particular server 184 may be a chassis management controller that is part of the rack-based subsystem 101. As another example, in accordance with some implementations, a particular server 184 may be a cloud-based server. As a further example, in accordance with some implementations, the nodes 103 may be part of a high performance computing (HPC) cluster, the system power manager 186 may be executed by processors 192 of one or multiple administrative nodes of the cluster; and the cooling manager 188 and the job power manager 189 may be executed by processors 192 of a chassis management controller of the rack-based subsystem 101.

In accordance with further implementations one or multiple of the system power manager 186, the cooling manager 188 and/or the job power manager 189 may be formed from dedicated hardware (e.g., logic gates) that performs one or multiple functions without executing machine-executable instructions. In this manner, this hardware may, depending on the particular implementation, be an application specific integrated circuit (ASIC), a field programmable gate array (FPGA), a complex programmable logic device (CPLD), and so forth.

In general, as depicted at reference numeral 181 of FIG. 1, the server(s) 184 may be coupled to the server blades 114 via rack interconnect fabric and/or network fabric 182. As examples, the rack interconnect fabric may include a backplane, backplane connectors, bus interfaces, network cables, one or multiple network switches, as well as possibly other and/or different rack interconnect fabric components. The network fabric 182 may be one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

Turning now to more specific details of the job scheduling, in accordance with example implementations, the system power manager 186 determines a $P_{NODE\ MIN}$ minimum power consumption for each cooling domain 111. The $P_{NODE\ MIN}$ minimum power consumption level is the minimum collective power to be consumed by the nodes 103 of a given cooling domain 111 to maintain a temperature of the cooling domain's outgoing coolant flow at or above the $T_{EXIT}$ temperature (the target temperature). The system power manager 186 may schedule jobs for the nodes 103 of a given cooling domain 111 so that the collective power consumption for the jobs meets or exceeds the $P_{NODE\ MIN}$ minimum power consumption determined for the cooling domain 111.

The following describes the relationship of cooling system parameters and node power consumption for a given cooling domain 111, in accordance with example implementations. The thermal power (called the "Q absorbed thermal power" herein) that is captured, or absorbed, by the coolant flow of a cooling domain 111 may be described as follows:

$$Q = V \cdot D_W \cdot C_W \cdot (Tin - Tout). \quad \text{Eq. 1}$$

In Equation 1, "V" represents a volume flow of the coolant. "$D_W$" represents a density of the coolant (e.g., a water density) at operating temperature and pressure. "$C_W$" represents a specific heat capacity of the coolant at operating temperature and pressure. "$T_{in}$" represents the inlet temperature of the coolant flow (e.g., the temperature of the coolant flow at or near the outlet port of the coolant supply manifold 140), and "$T_{out}$" represents the outlet temperature of the coolant flow (e.g., the temperature of the coolant flow at or near the inlet port of the coolant return manifold 168).

As can be seen from Eq. 1, the Q thermal power varies directly with the V volume of the coolant flow. Therefore, an increasing V volume flow results in more waste heat being captured by the coolant flow, and vice versa. Moreover, as can also be observed from Eq. 1, an increasing V volume results in a decreasing $T_{OUT}$ coolant outlet temperature, and decreasing the V volume increases the $T_{OUT}$ coolant outlet temperature.

The Q absorbed thermal power may be directly correlated to the collective power consumption of the nodes 103, as proportioned by the cooling system effectiveness. In this context, the "cooling system effectiveness" refers to the amount of waste heat that is captured, or absorbed, by the coolant flow. The cooling manager 188, in accordance with example implementations, may be constrained to regulate the V volume of the coolant flow over a certain range of volume flows, with a lower boundary of this range being referred to as the "$V_{MIN}$ minimum volume" herein. In accordance with example implementations, $P_{NODE\ MIN}$ is the minimum collective power consumption for the nodes 103 to maintain the $T_{OUT}$ coolant outlet temperature at the $T_{EXIT}$ target temperature, given the $V_{MIN}$ minimum volume.

The system power manager 186, in accordance with example implementations, may determine the $P_{NODE\ MIN}$ minimum power consumption for a given cooling domain 111 as follows:

$$P_{NODE\ MIN} = \frac{V_{MIN} \cdot D_W \cdot C_W \cdot |(T_{IN} - T_{EXIT})|}{\text{Cooling system effectiveness}}, \quad \text{Eq. 2}$$

wherein "|" represents an absolute value operator. Because the $T_{IN}$ coolant inlet temperature of the cooling domain 111 may change over time, in accordance with some implementations, the system power manager 186 may recalculate the $P_{NODE\ MIN}$ minimum collective power consumption from time to time. For example, the system power manager 186 may calculate the $P_{NODE\ MIN}$ minimum collective power consumption for a particular cooling domain 111 each time the system power manager 186 schedules a job for the nodes 103 of the cooling domain 111. As another example, the system power manager 186 may calculate the $P_{NODE\ MIN}$ minimum collective power consumption for a particular cooling domain 111 each time the system power manager 186 initiates a process to schedule a batch of jobs for the nodes 103 of the cooling domain 111. As another example, the system power manager 186 may calculate the $P_{NODE\ MIN}$ minimum collective power consumption pursuant to a schedule. As another example, the system power manager 186 may calculate the $P_{NODE\ MIN}$ minimum collective power consumption for a given cooling domain 111 responsive to the occurrence of an event (e.g., a blade server 114 or group of blade servers 114 powering up, coming out of reset or powering down) other than an event pertaining to the scheduling of a job or a batch of jobs.

Figure 2:
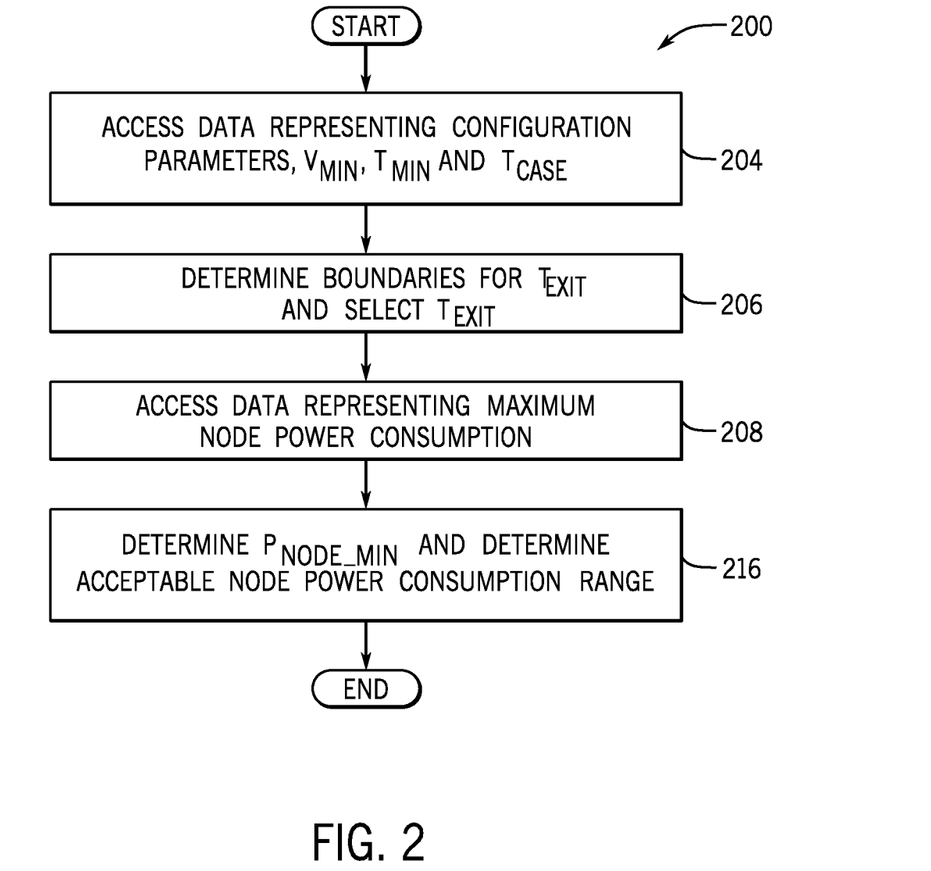
FIG. 2 is a flow diagram depicting a process to determine an acceptable power consumption range for jobs to be executed by processor-based nodes of a cooling domain according to an example implementation.

FIG. 2 depicts an example process 200 for determining an acceptable power consumption range for a job in accordance with example implementations. As an example, the job power manager 186 of FIG. 1 may perform the process 200 prior to the scheduling of jobs for a job batch for the nodes 103 of a particular cooling domain 111 and use the acceptable power consumption range to evaluate candidate jobs for the job batch. In this manner, as further described herein, in accordance with example implementations, the job power manager 186 may determine whether the expected power consumption for a given candidate job (as represented by the job's power profile) falls within the acceptable power consumption range and determine whether the candidate job should be scheduled as part of the job batch based on this determination.

Referring to FIG. 2, in accordance with some implementations, the process 200 includes accessing (block 204) data that represents one or multiple configuration parameters, the $V_{MIN}$ minimum coolant volume, the $T_{IN}$ coolant inlet temperature for the cooling domain and a $T_{CASE}$ temperature. In accordance with example implementations, the $T_{CASE}$ temperature is the minimum of the maximum allowable surface temperatures of the components (e.g., semiconductor packages) of the cooling domain 111. The $T_{CASE}$ temperature imposes a constraint on the choice of the $T_{EXIT}$ temperature for the cooling domain. In this manner, the $T_{CASE}$ temperature conjunction with the $V_{MIN}$ minimum coolant volume and a VMAX maximum coolant define the upper and lower boundaries for the $T_{EXIT}$ temperature. As examples, the configuration parameters for the cooling domain may be a cooling system effectiveness parameter, a $D_W$ coolant density and a $C_W$ coolant specific heat capacity. Pursuant to block 206, the process 200 includes determining the upper and lower boundaries for the $T_{EXIT}$ temperature and selecting a $T_{EXIT}$ temperature for the cooling domain 111 within these boundaries.

Pursuant to block 208, the process 200 includes determining a maximum node power consumption. A maximum node power consumption for a node 103 may be based on thermal criteria for one or multiple hardware component(s) of the node 103. In accordance with some implementations, the maximum node power consumption may be the minimum of the maximum node power consumptions of the nodes 103 of the cooling domain 111.

Pursuant to block 216, the process 200 includes determining the $P_{NODE\_MIN}$ minimum collective power consumption. The minimum power per job defines the lower boundary of the acceptable node power consumption range. As an example, the acceptable node power consumption range may be the same for all nodes 103 of the cooling domain 111, with the lower boundary of the range being the $P_{NODE\_MIN}$ minimum collective power consumption divided by the number of nodes 103 of the cooling domain 111 and the upper boundary of the range being the maximum node power consumption that is determined in block 208.

As another example, the acceptable node power consumption range may be specific for each node 103. For example, the acceptable node power consumption range for a given node 103 may have an upper boundary that corresponds to the maximum power consumption limit for the node 103 and the lower boundary of the power range being the $P_{NODE\_MIN}$ minimum collective power consumption divided by the number of nodes 103.

As another example, the process 200 may set different lower boundaries for individual acceptable node power consumption ranges, with the sum of the lower boundaries being equal or near to the $P_{NODE\_MIN}$ minimum collective power consumption.

Figure 3:
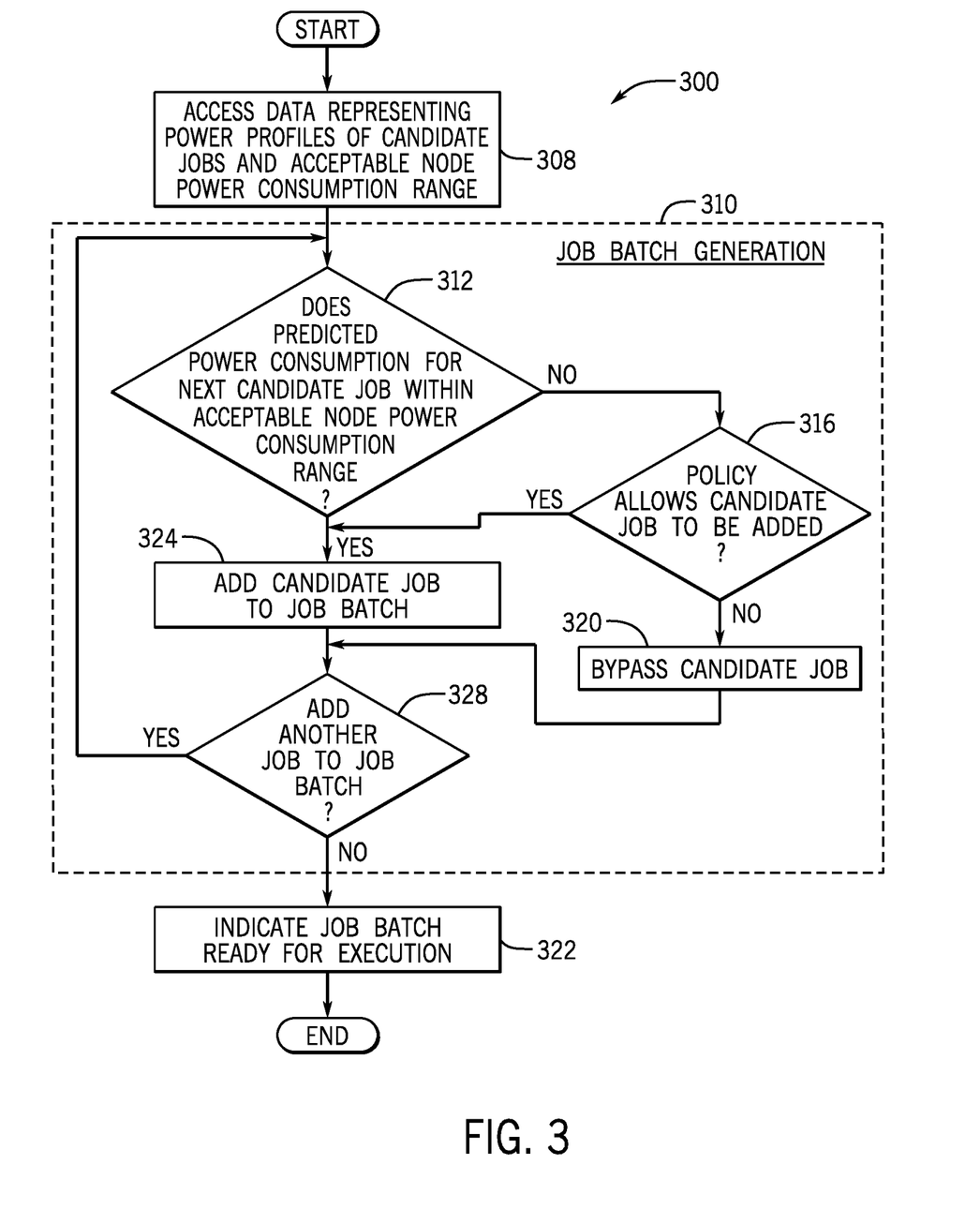
FIG. 3 is a flow diagram depicting a process to schedule jobs for execution by processor-based nodes of a cooling domain to regulate the temperature of a coolant flow provided by the cooling domain according to an example implementation.

FIG. 3 depicts an example process 300 that may be used for purposes of scheduling a batch of jobs for the nodes of a cooling domain, in accordance with some implementations. As an example, the process 300 may be initiated responsive to nodes of a cooling domain indicating idle statuses, or availabilities to execute jobs. As an example, the process 300 may be performed by the system power manager 186 of FIG. 1.

Referring to FIG. 3, in accordance with some implementations, the process 300 includes, pursuant to block 308, accessing data that represents the power profiles of candidate jobs and the acceptable node power consumption range for the node. The data may also represent power profiles of jobs that are executing or are scheduled to execute on other nodes of the cooling data. The process 300 next includes, pursuant to a subprocess 310, generating a job batch containing a number of jobs for the nodes to execute.

In accordance with some implementations, the job batch generation subprocess 310 includes evaluating candidate jobs. More specifically, the subprocess 310 may first include determining (decision block 312) whether the predicted power consumed for the next candidate job (as represented by the associated power profile) is within the boundaries of the acceptable node power consumption range. If not, then, pursuant to decision block 316, a determination is made whether a particular policy allows the candidate job to be added, even though the candidate job is not within the acceptable node power consumption range. In accordance with some implementations, a particular policy may, for example, specify that a candidate job is not to be scheduled if the predicted power consumption is outside of the acceptable node power consumption range. Therefore, pursuant to block 320, the candidate job is bypassed.

In accordance with further implementations, a policy may allow a predetermined deviation from a strict application of the acceptable node power consumption range. For example, the policy may specify that a candidate job may be scheduled if the predicted power consumption is within a specified percentage of the lower boundary of the acceptable node power consumption range. As another example, the process 300 may include predicting a collective power consumption by all of the nodes of the jobs scheduled for the job batch so far and allowing a certain deviation on the lower boundary based on this predicted collective power consumption.

If the candidate job is to be added to the job batch (e.g., the "Yes" prong of decision block 312 or the "Yes" prong of decision block 316), then, pursuant to block 324, the process 300 includes adding the candidate job to the job batch. Next, pursuant to decision block 328, the process 300 includes determining whether another candidate job should be added to the job batch. This determination may be based on any of a number of factors, such as, for example, a target size for the job batch, an expected duration of processing time for the job batch, the predicted collective power consumption for the jobs already scheduled for the job batch, whether compatible candidate jobs (e.g., jobs from the same application or rank) exist, or one or multiple other factors. If another job is to be added, then, as depicted in FIG. 3, control returns to decision block 312. Otherwise, in accordance with example implementations, the process 300 includes indicating (block 322) that the job batch is ready for execution. This indication may include, in accordance with example implementations, communicating the job batch to a job power manager, such as job power manager 189 of FIG. 1.

Figure 4:
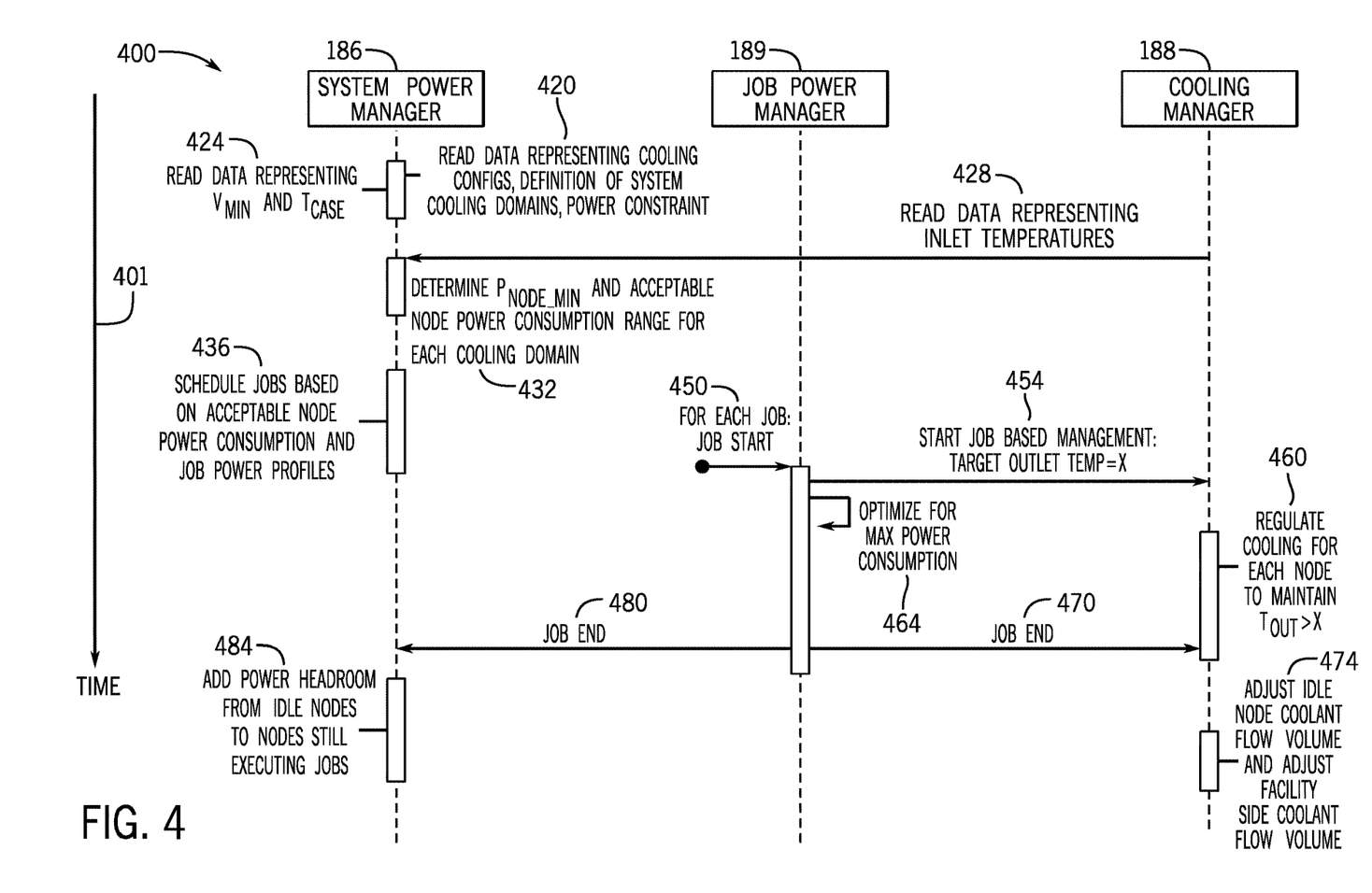
FIG. 4 is a sequence diagram illustrating communications among components of a computer system and actions taken by the components to regulate the temperature of a coolant flow that is provided by the computer system to a captured waste heat consumer system according to an example implementation.

FIG. 4 depicts a sequence diagram 400 illustrating communications among and actions performed by the system power manager 186, the job power manager 189 and the cooling manager 188 according to an example implementation. The sequence diagram 400 occurs according to a time line 401.

Referring to FIG. 4, the sequence diagram 400 first depicts (according to the time line 401) the system power manager 186 scheduling jobs. More specifically, the scheduling includes the system power manager 186 reading 420 data representing cooling configurations, a definition of system cooling domains and power constraints. Moreover, the system power manager 186, as represented at 424, reads data representing the $V_{MIN}$ minimum volume flow rate and the $T_{EXIT}$ minimum outlet coolant temperature for each domain. Moreover, as depicted at 428, the system power manager 186 may communicate with the cooling manager 188 to read data representing inlet temperatures of the cooling domains. From this information, the system power manager 186 may then determine at 432 a $P_{NODE\_MIN}$ minimum power consumption level and an acceptable node power consumption range for each cooling domain. The system power manager 186 may then, as indicated at 436, schedule jobs based on the power ranges, the $P_{NODE\_MIN}$ power consumptions and job power profiles. This scheduling may include the system power manager 186 sending a message to the job power manager 189.

FIG. 4 depicts actions taken by the job power manager 189 that includes, as depicted at 450, for each job, starting the job and communicating (as depicted at 454) with the cooling manager 188 to set a target outlet temperature X for the cooling domain.

The job power manager 189 may then optimize the execution of the job for maximum power consumption, as depicted at 464. At the conclusion of each job, the job power manager 189 may then communicate (as depicted at 480) an indication of the end of the job to the system power manager 186 as well as communicate (at 470) an indication of the end of the job to the cooling manger 188. Responsive to the indication of the job ending from the job power manager 189, in accordance with example implementations, the system power manager 186 may add power headroom from idle nodes to nodes still executing jobs, as depicted at 484. Moreover, responsive to the ending of a job, the cooling manager may, as depicted at 474, adjust the coolant flow volumes for idle nodes (e.g., decrease the coolant flow volume(s) by regulate flow control devices) and adjust the facility site coolant flow volume (e.g., adjust the valve 161 of FIG. 1 to decrease the volume of the primary coolant flow).

Figure 5:
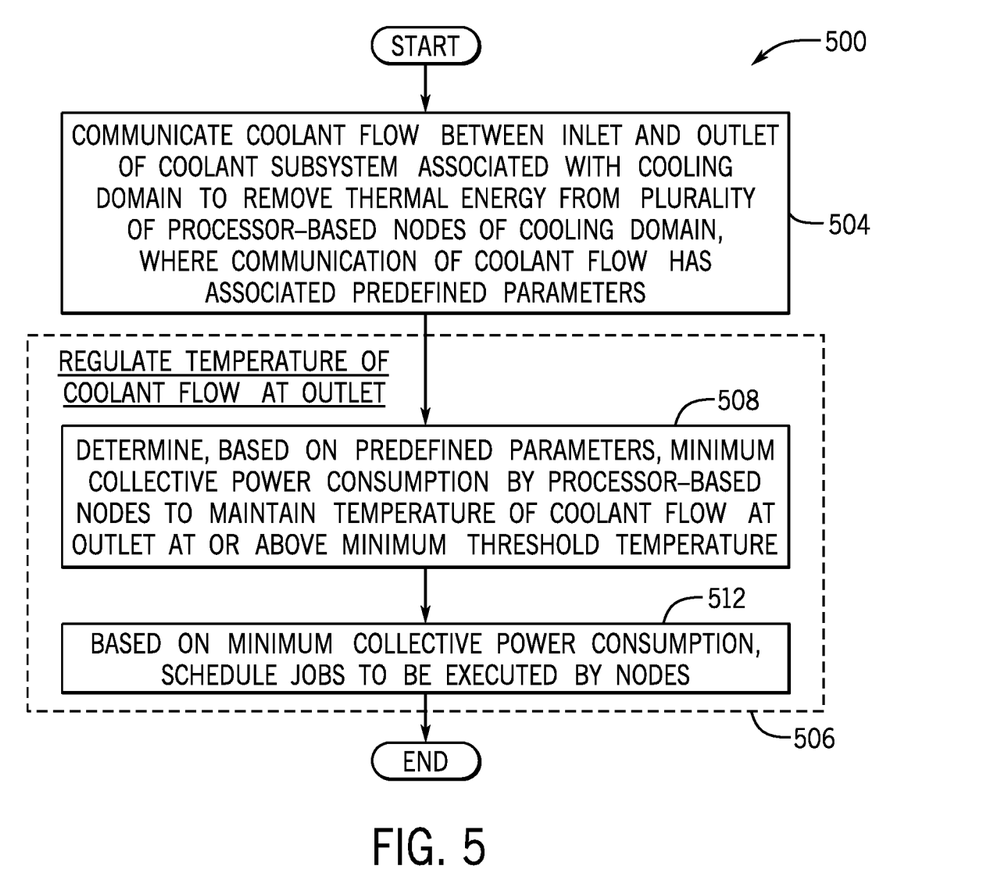
FIG. 5 is a flow diagram of a process to schedule jobs to maintain a temperature of a coolant flow at an outlet at or above a minimum temperature according to an example implementation.

Referring to FIG. 5, in accordance with example implementations, a process 500 includes communicating (block 504) a coolant flow between an inlet and an outlet of a coolant subsystem that is associated with a cooling domain to remove thermal energy from a plurality of processor-based nodes of the cooling domain. In accordance with example implementations, the nodes may be nodes hosted by one or multiple computer platforms, such as blade servers. In accordance with some implementations, a node may be associated with an operating system instance. In accordance with some implementations, a cooling domain may include one or multiple computer platforms, such as one or multiple blade servers. In accordance with some implementations, a cooling domain may include part of a computer platform (e.g., part of a blade server) or multiple computer platforms (e.g., multiple blade servers). In accordance with example implementations, a cooling domain may correspond to heat-dissipating components contained in a subpart of a rack-based computing system.

The communication of the coolant flow has associated predefined parameters. In accordance with example implementations, the predefined parameters may include a coolant density. In accordance with some implementations, the predefined parameters may include a minimum volume of the coolant flow. In accordance with example implementations, the predefined parameters may include a coolant specific heat capacity.

The process 500 includes regulating (block 506) a temperature of the coolant flow at the outlet. In accordance with example implementations, the regulation includes determining (block 508), based on the predefined parameters, a minimum collective power consumption by the processor-based nodes to maintain a temperature of the coolant flow at the outlet at or above a minimum temperature threshold, and, pursuant to block 512, based on the minimum power consumption, scheduling jobs to be executed by the nodes. In accordance with example implementations, a job refers to a unit of work to be executed by a particular node. In accordance with example implementations, an acceptable power range for each job may be determined. In accordance with example implementations, a lower boundary of the acceptable power range may be determined based on the minimum collective power consumption. In accordance with example implementations, an upper boundary of the acceptable power range may be determined based on thermal limit criteria of hardware components associated with the nodes.

In accordance with example implementations the temperature of the coolant flow at the outlet may be additionally regulated by enhancing (e.g., maximizing) the power consumption of a node when processing, or executing, a job. As an example, the node power consumption may be enhanced by removing a power cap, or limit, that is associated with an energy efficient operation of the node. As another example, the node power consumption may be enhanced by placing the node in a turbo mode.

In accordance with example implementations, the temperature of the coolant flow at the outlet may be additionally regulated through the regulation of a coolant flow volume. In accordance with some implementations, regulating a coolant flow volume may include regulating the speed of one or multiple flow control devices associated with the cooling domain. In accordance with some implementations, regulating a coolant flow volume may include regulating operation of a facility side valve (or primary coolant subsystem valve). In accordance with example implementations, a coolant flow from the outlet may be combined with coolant flows from other cooling domains to form a composite cooling flow containing captured waste heat from the cooling domains. In accordance with some implementations, the coolant flows from the cooling domains may be circulated through a heat exchanger for purposes of transferring captured waste heat from the cooling domains to a coolant flow of a primary coolant subsystem. In accordance with some implementations, the primary coolant subsystem may circulate a coolant flow for purposes of providing an outlet coolant flow to a captured waste heat consumer system.

In accordance with example implementations, a coolant flow volume of cooling domain may be restricted responsive to one or multiple nodes of the cooling domain becoming idle. In accordance with example implementations, a coolant flow volume of the facility side may be restricted responsive to one or multiple nodes becoming idle.

Figure 6:
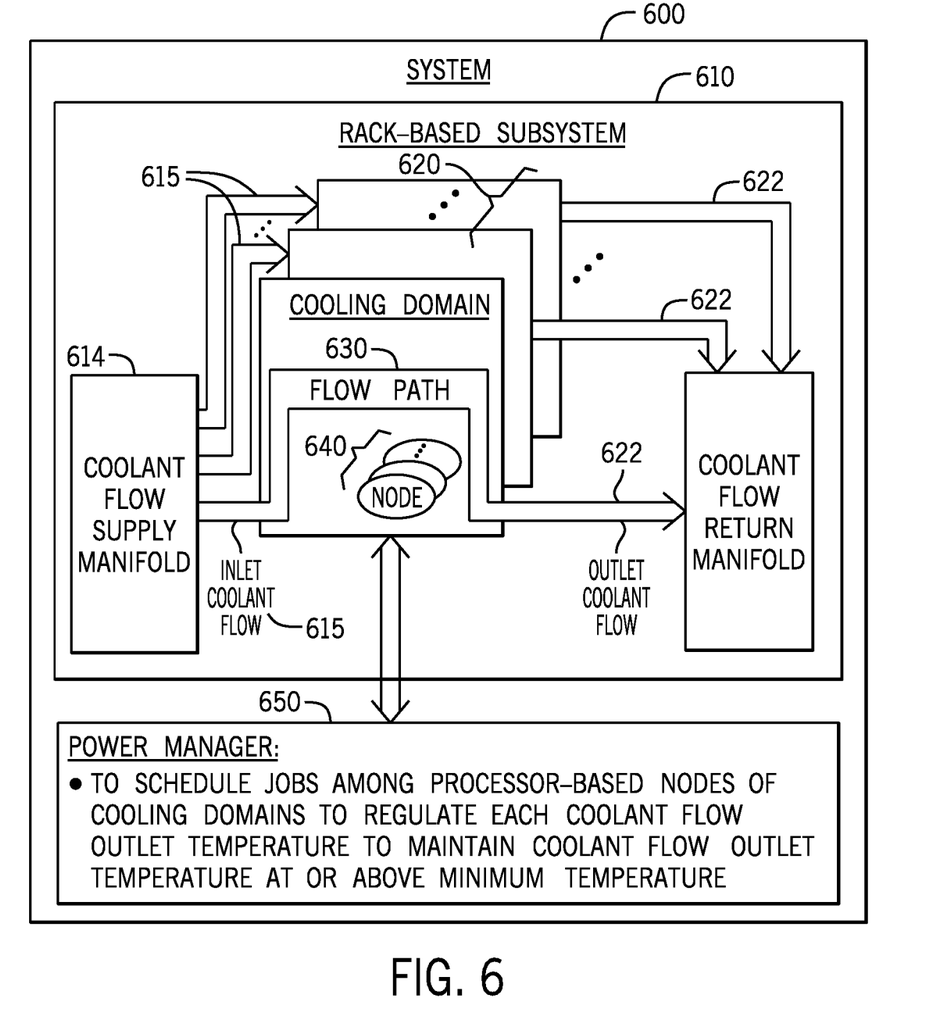
FIG. 6 is a block diagram of a system to schedule jobs among processor-based nodes of cooling domains to maintain a coolant flow outlet temperature at or above a minimum temperature according to an example implementation.

Referring to FIG. 6, in accordance with example implementations, a system 600 includes a rack-based computer subsystem 610; and a power manager 650. The rack-based computer subsystem 610 includes a coolant supply manifold to communicate an inlet coolant flow; a coolant return manifold 618 to communicate an outlet coolant flow 622; and a plurality of cooling domains 620. Each cooling domain 620 is associated with a coolant outlet temperature and includes a flow path 630 to communicate a coolant flow between the coolant supply manifold 614 and the coolant return manifold 618. The cooling domain 620 further includes processor-based nodes 640. The flow path 630 may include one or multiple coolant flow plates, or cold plates.

The rack-based computer subsystem 610 may include blade servers that are associated with the nodes. The nodes 640 may be associated with operating system instances. The cooling domain 620 may include one or multiple blade servers.

The power manager 650 may be provided by a chassis management controller of the rack-based subsystem 601 executing machine-executable instructions, or software, in accordance with example implementations. In accordance with further example implementations, the power manager 650 may be provided by a server that is remotely disposed with respect to the rack-based subsystem 601.

The power manager 650 schedules jobs among the processor-based nodes 640 to regulate each coolant outlet temperature 622 to maintain the coolant outlet temperature 622 at or above a minimum temperature.

In accordance with example implementations, the system 600 may further include a job power manager that manages executions of the jobs by the nodes 640. The job power manager may be implemented by one or multiple processors executing machine-readable instructions (or in software), by hardware that does not execute machine-readable instructions, or by a combination of such software and hardware. The job power manager may enhance (e.g., maximize) the power consumption of a node 640 when processing, or executing, a job. As an example, the job power manager may enhance node power consumption by removing a power cap, or limit, that is associated with an energy efficient operation of the node 640. As another example, the job power manager may enhance node power consumption by placing a node 640 in a turbo mode.

In accordance with example implementations, the system 600 may further include a cooling manager that manages coolant flow volumes for purposes of regulating coolant temperatures. The cooling manager may be implemented by one or multiple processors executing machine-readable instructions (or in software), by hardware that does not execute machine-readable instructions, or by a combination of such software and hardware. In accordance with some implementations, the cooling manager may regulate a coolant flow volume by regulating one or multiple flow control devices that are associated with a cooling domain 620. In accordance with some implementations, the cooling manager may regulate a coolant flow volume by regulating operation of a facility side valve. In accordance with example implementations, the cooling manager may reduce a coolant flow volume of a cooling domain responsive to one or multiple nodes 640 of a cooling domain 620 becoming idle. In accordance with example implementations, the cooling manager may reduce coolant flow volume of the facility side responsive to one or multiple nodes 640 becoming idle.

Figure 7:
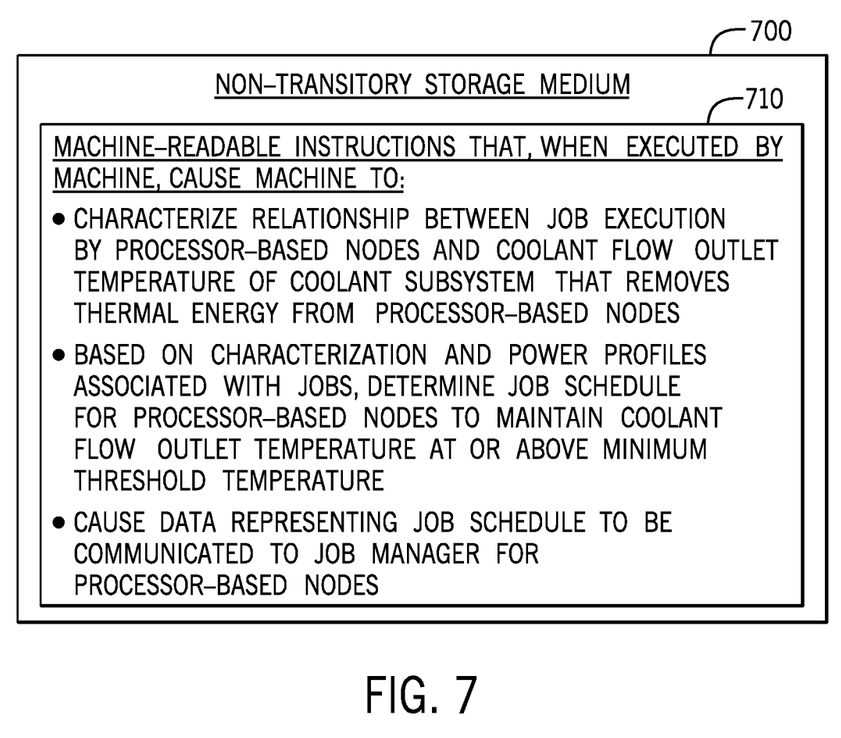
FIG. 7 is an illustration of a non-transitory storage medium that stores machine-readable instructions that, when executed by a machine, cause the machine to schedule jobs for processor-based nodes to maintain a minimum coolant outlet temperature at or above a minimum threshold temperature according to an example implementation.

Referring to FIG. 7, in accordance with example implementations, a non-transitory storage medium 700 stores machine-readable instructions 710 that, when executed by a machine, cause a machine to characterize a relationship between job execution by processor-based nodes and a coolant temperature of a coolant subsystem that removes thermal energy from the processor-based nodes. In accordance with example implementations, the machine may include a chassis management controller, and the instructions 710 may be executed by one or multiple processors (e.g., CPU cores) of the chassis management controller.

In accordance with example implementations, the nodes may be nodes hosted by one or multiple computer platforms, such as blade servers. In accordance with some implementations, a node may be associated with an operating system instance. In accordance with some implementations, a cooling domain may include one or multiple computer platforms, such as one or multiple blade servers. In accordance with some implementations, a cooling domain may include part of a computer platform (e.g., part of a blade server) or multiple computer platforms (e.g., multiple blade servers).

In accordance with example implementations, a cooling domain may correspond to heat-dissipating components contained in a subpart of a rack-based computing system.

The instructions 710, when executed by the machine, further cause the machine to, based on the characterization and power profiles that are associated with a plurality of jobs, determine a job schedule for the plurality of processor-based nodes to maintain the coolant outlet temperature at or above a minimum threshold temperature. The instructions 710, when executed by the machine, further cause the machine to cause data representing the job schedule to be communicated to a job manager for the processor-based nodes. In accordance with example implementations, the job manager may manage the execution of the jobs in a manner that enhances (e.g., maximizes) the node power consumption.

In accordance with example implementations, the scheduling includes determining a candidate job profile based on the minimum collective power consumption, and selecting a given candidate job to be executed based on the power profile of the given candidate job. Among potential advantages, the power efficiency of a computer system may be enhanced.

In accordance with example implementations, determining the candidate job profile includes determining an allowable range of power consumption levels. Among potential advantages, the power efficiency of a computer system may be enhanced.

In accordance with example implementations, the scheduling incudes determining power profiles for a plurality of candidate jobs and selecting a subset of candidate jobs based on the power profiles. Among potential advantages, the power efficiency of a computer system may be enhanced.

In accordance with example implementations, the scheduling includes determining, based on the minimum power consumption, a second power consumption less than the minimum power consumption, and scheduling the jobs based on the second power consumption. The method further includes regulating the communication of the coolant flow to, during the execution of the jobs by the nodes, maintain the temperature of the coolant flow at the outlet at or above the minimum threshold temperature. Among potential advantages, the power efficiency of a computer system may be enhanced.

In accordance with example implementations, the method further includes, during the execution of the jobs by the nodes, regulating the communication of the coolant flow to maintain the temperature of the coolant at the output at or above the minimum threshold temperature. Among potential advantages, the power efficiency of a computer system may be enhanced.

In accordance with example implementations, regulating the communication of the coolant flow includes at least one of the following: regulating operation of a coolant pump associated with the plurality of processor-based nodes, where the coolant pump is disposed on a server blade tray that contains the plurality of processor-based nodes; regulating a flow control valve upstream of a supply manifold that provides a coolant flow to the coolant subsystem and at least one other coolant subsystem associated with another plurality of processor-based nodes; or regulating a flow control valve downstream of a return manifold that provides a coolant flow. Among potential advantages, the power efficiency of a computer system may be enhanced.

In accordance with example implementations, the method further includes managing the execution of the jobs to regulate the temperature of the coolant at the outlet. Among potential advantages, the power efficiency of a computer system may be enhanced.

In accordance with example implementations, regulating the communication of the coolant includes, responsive to the plurality of processor-based nodes completing the jobs, reducing a volume of the coolant flow. Among potential advantages, the power efficiency of a computer system may be enhanced.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
communicating a coolant flow between an inlet and an outlet of a coolant subsystem associated with a cooling domain to remove thermal energy from a plurality of processor-based nodes of the cooling domain, wherein the communication of the coolant flow has associated predefined parameters; and
regulating a temperature of the coolant flow at the outlet, comprising:
determining, based on the predefined parameters, a minimum collective power consumption by the processor-based nodes to maintain a temperature of the coolant flow at the outlet at or above a minimum threshold temperature; and
based on the minimum collective power consumption, scheduling jobs to be executed by the nodes.

2. The method of claim 1, wherein the scheduling comprises:
determining a candidate job profile based on the minimum collective power consumption; and
selecting a given candidate job of a plurality of candidate jobs to be executed by at least one of the nodes based on a power profile of the given candidate job.

3. The method of claim 2, wherein determining the candidate job profile comprises determining an allowable range of power consumption levels.

4. The method of claim 1, wherein the scheduling comprises:
determining power profiles for a plurality of candidate jobs;
selecting a subset of candidate jobs of the plurality of candidate jobs based on the power profiles.

5. The method of claim 1, wherein the scheduling comprises determining, based on the minimum collective power consumption, a second power consumption less than the minimum collective power consumption, and scheduling the jobs based on the second power consumption, the method further comprising:
regulating the communication of the coolant to, during the execution of the jobs by the nodes, maintain the temperature of the coolant flow at the outlet at or above the minimum threshold temperature.

6. The method of claim 1, further comprising:
during the execution of the jobs by the nodes, regulating a volume of the coolant flow to maintain the temperature of the coolant flow at the outlet at or above the minimum threshold temperature.

7. The method of claim 6, wherein regulating the communication of the coolant flow comprises at least one of the following:

regulating operation of a coolant pump associated with the plurality of processor-based nodes, wherein the coolant pump is disposed on a server blade tray that contains the plurality of processor-based nodes;
regulating a flow control valve upstream of a supply manifold that provides the coolant flow to the coolant subsystem and at least one other coolant subsystem associated with another plurality of processor-based nodes; or
regulating a flow control valve downstream of a return manifold that provides the coolant flow.

8. The method of claim 1, further comprising:
managing the execution of the jobs to regulate the temperature of the coolant flow at the outlet.

9. The method of claim 1, wherein regulating the communication of the coolant flow comprises, responsive to the plurality of processor-based nodes completing the jobs, reducing a volume of the coolant flow.

10. A system comprising:
a rack-based computer subsystem comprising:
a coolant supply manifold to communicate an inlet coolant flow;
a coolant return manifold to communicate an outlet coolant flow;
a plurality of cooling domains, wherein each cooling domain of the plurality of cooling domains is associated with a coolant outlet temperature and comprises:
a flow path to communicate a coolant flow between the coolant supply manifold and the coolant return manifold, wherein the flow path comprises an outlet coupled to the return manifold and providing the coolant outlet temperature; and
processor-based nodes; and
a power manager to schedule jobs among the processor-based nodes of the plurality of cooling domains to regulate each coolant outlet temperature to maintain the coolant outlet temperature at or above a minimum temperature.

11. The system of claim 10, wherein the power management controller to further, for a given cooling domain of the plurality of cooling domains:
determine a minimum collective power consumption by the processor-based nodes of the given cooling domain to maintain the coolant outlet temperature of the given cooling domain at the minimum temperature; and
schedule jobs for the processor-based nodes of the given cooling domain based on the minimum collective power consumption.

12. The system of claim 10, wherein a given cooling domain of the plurality of cooling domains comprises a pump connected to the flow path of the given cooling domain, the system further comprising:
a cooling manager to regulate operation of the pump during execution of jobs by the processor-based nodes of the cooling domain to maintain the coolant outlet temperature at or above the outlet the minimum temperature.

13. The system of claim 12, wherein a coolant management controller to further regulate operation of the pump responsive to the processor-based nodes of the cooling domain transitioning to idle states.

14. The system of claim 12, wherein a given cooling domain of the plurality of cooling domains comprises a blade server tray, and the processor-based nodes are mounted to the blade server tray.

15. The system of claim 12, further comprising:
a job manager to receive data from the power manager scheduling a given job of the jobs, wherein the job manager to optimize the job to enhance power consumption.

16. A non-transitory storage medium to store machine-readable instructions that, when executed by a machine, cause the machine to:
characterize a relationship between job execution by a plurality of processor-based nodes and a coolant flow outlet temperature of a coolant subsystem that removes thermal energy from the plurality of processor-based nodes;
based on the characterization and power profiles associated with a plurality of jobs, determine a job schedule for the plurality of processor-based nodes to maintain the coolant flow outlet temperature above a minimum threshold temperature; and
cause data representing the job schedule to be communicated to a job manager for the plurality of processor-based nodes.

17. The storage medium of claim 16, wherein the instructions, when executed by the machine, further cause the machine to characterize the relationship based on a minimum coolant flow volume, an effectiveness of the coolant subsystem and a maximum processor node temperature.

18. The storage medium of claim 16, wherein the instructions, when executed by the machine, further cause the machine to:
determine a candidate job profile based on the characterization; and
select a given candidate job of a plurality of candidate jobs to be executed by at least one of the processor-based nodes of the plurality of processor-based nodes based on a power profile of the given candidate job.

19. The storage medium of claim 16, wherein:
the characterization comprises an aggregate power consumption by the plurality of processor-based nodes; and
the candidate job profile comprises a target power consumption based on an average of the aggregate power consumption.

20. The storage medium of claim 16, wherein:
the characterization comprises an aggregate power consumption by the plurality of processor-based nodes; and
the candidate job profile comprises a target power consumption range based on the aggregate power consumption.

* * * * *